United States Patent [19]

Herubel

[11] 4,451,952

[45] Jun. 5, 1984

[54] SUSPENSION DEVICE FOR A POWER-DRIVEN HANDTOOL

[75] Inventor: Jean-Frédéric Herubel, Guebwiller, France

[73] Assignee: N. Schlumberger & Cie, Guebwiller, France

[21] Appl. No.: 387,490

[22] Filed: Jun. 11, 1982

[30] Foreign Application Priority Data

Jul. 7, 1981 [FR] France ................................ 81 13317

[51] Int. Cl.$^3$ ................................................ A22B 3/02

[52] U.S. Cl. ........................................ 17/1 B; 17/44; 17/23

[58] Field of Search ..................... 17/1 B, 1 E, 68, 23, 17/44.2, 21, 11, 44

[56] References Cited

U.S. PATENT DOCUMENTS 3,147,513 9/1964 Schneider et al. ...................... 17/11

3,886,658 6/1975 Wikoff ................................ 17/23 X

FOREIGN PATENT DOCUMENTS 871407 5/1971 Canada .................................... 17/23

1261597 4/1961 France .................................. 17/1 B

*Primary Examiner*—Willie G. Abercrombie

*Attorney, Agent, or Firm*—Toren, McGeady and Stanger

[57] ABSTRACT

The suspension device for a power-driven handtool such as a humane killer comprises a yoke having two arms pivotally mounted on two pivots whose common horizontal geometrical axis passes substantially through the center of gravity of the handtool unit. The apex of the yoke is constituted by a bow having the shape of a circular arc whose center is located at the center of gravity of the handtool. Said bow is supported by and capable of traveling on a roller which is freely rotatable on a spindle supported by two arms of a shackle, the central portion of which is attached to a suspension cable.

2 Claims, 4 Drawing Figures

SUSPENSION DEVICE FOR A POWER-DRIVEN HANDTOOL

This invention relates to suspended power-driven handtools, especially those which are operated by an external source of energy such as pneumatic or hydraulic energy, electrical energy or mechanical energy (for example by means of a flexible cable) or else handtools equipped with small internal-combustion motors.

The invention is primarily but not exclusively concerned with compressed-air pistols of the humane killer type for slaughtering animals. It is widely acknowledged that reliability is one of the basic requirements attached to the use of humane-killer pistols. It is in fact essential to ensure that the animal is killed outright at the first pistol shot. Handtools of this type must therefore be highly convenient to handle without being excessively tiring for the user. In practice, however, the striker-pin which strikes the forehead of the animal to be slaughtered is rigidly fixed to the piston of a pneumatic jack. The handtool is consequently subject to a recoil effect which is not unlike the recoil motion of firearms, or so-called "gun reaction". This effect can be reduced by providing the handtool structure with a relatively large mass but the handtool then becomes heavy and cumbersome.

The object of the invention is to improve the suspension devices of handtools of the type under consideration with a view to reducing the disadvantages of conventional devices as recalled in the foregoing.

To this end, the suspension device according to the invention comprises a yoke, the ends of the two yoke-arms being pivotally mounted respectively on two pivots whose common horizontal geometrical axis passes substantially through the center of gravity of the handtool unit. The apex of said yoke is constituted by a bow having the shape of a circular arc whose center is located at the center of gravity of the handtool. Said bow is supported by and capable of traveling on a roller which is freely rotatable on a spindle supported by the two ends of the arms of a shackle whose apex is adapted to be attached to a suspension member.

By virtue of this particular structure, the handtool can be oriented in an effortless manner and in all directions in space since it is suspended in such a manner as to be capable of pivoting about its center of gravity and about three perpendicular axes, namely on the one hand two horizontal perpendicular axes (the geometrical axis of the two pivots of the yoke and the geometrical axis of the bow) and, on the other hand, the vertical axis of the suspension member (suspension cable, chain, or swivel-hook) which is perpendicular to the first two axes. In other words, operation of the handtool is no longer dependent on the action of gravity on the mass of the handtool, with the result that it becomes possible to increase this mass at will and without any difficulty.

The design concept of a bow supported by a roller and capable of displacement in rolling motion on this latter permits pivotal movements about a horizontal geometrical axis, the physical realization of which would result, however, in a structure of prohibitive size, thus making the handtool unserviceable in actual practice.

In an advantageous embodiment which is applicable when energy is supplied to the handtool by means of a pipe or an electric cable, said pipe or cable is connected to the handtool by means of the yoke, with the result that its stiffness no longer has any influence on handling of the tool.

These and other features of the invention will be more apparent upon consideration of the following description and accompanying drawings which are given by way of example and illustrate one embodiment of the invention as applied to the suspension of a compressed-air pistol of the humane killer type, and in which.

Figure 1:
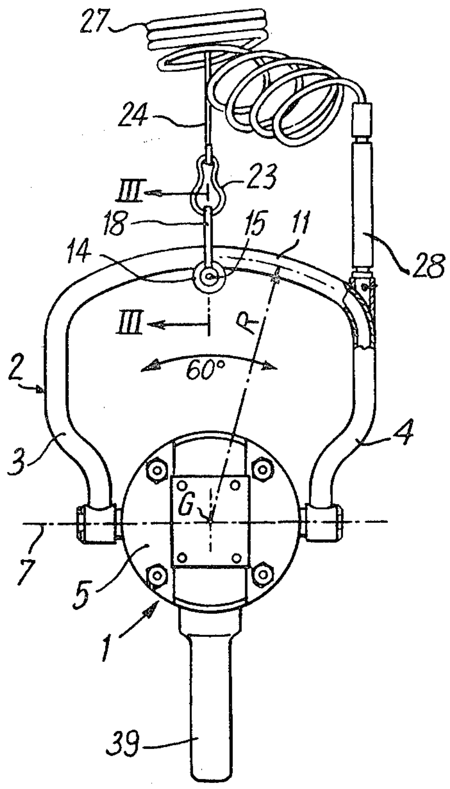
FIG. 1 is a front view of the handtool unit together with its suspension device.
Figure 2:
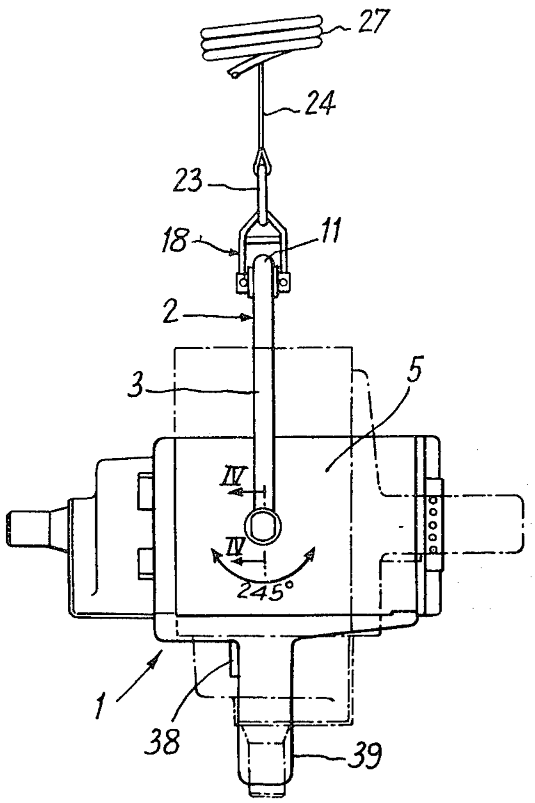
FIG. 2 is a corresponding profile view.
Figure 4:
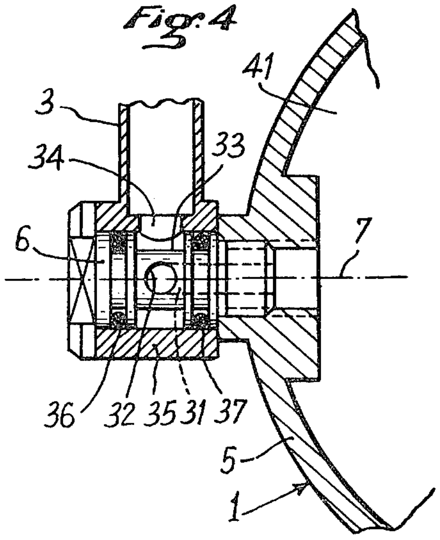
FIG. 4 is a part-sectional view to a larger scale and taken along line IV—IV of FIG. 2.

Referring to FIGS. 1 and 2, the suspension device for a compressed-air slaughtering pistol 1 or so-called "humane killer" comprises a yoke 2 having two arms 3, 4, the ends of which are pivotally mounted on the pistol body 5 respectively by means of two pivots such as the pivot 6, for example (as also shown in FIG. 4). The horizontal geometrical axis 7 which is common to both pivots passes substantially through the center of gravity G of the pistol.

Figure 3:
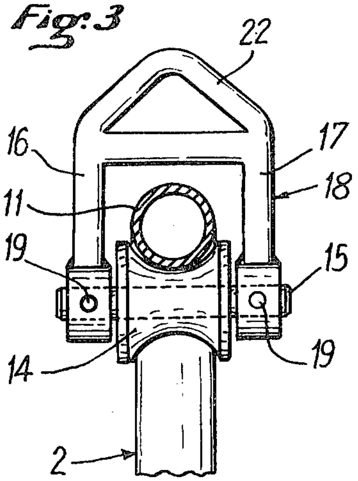
FIG. 3 is a part-sectional view to a larger scale and taken along line III—III of FIG. 1.

The apex of the yoke 2 is constituted by a bow 11 having the shape of a circular arc, the center of which is located at the center of gravity G of the handtool. The mean radius of said circular arc is indicated at R in FIG. 1. The bow 11 is supported by and capable of traveling on a roller 14 having a rounded groove (as also shown in FIG. 3). Said roller 14 is freely rotatable on a spindle 15 which is supported by the two ends of the arms 16, 17 of a shackle 18 and which is fixed in these latter by means of screws or locking-pins 19, for example. The central portion or apex 22 of the shackle 18 is attached to a suspension member consisting of a snap-hook 23, for example, which is in turn suspended from a cable 24.

A compressed-air source (not shown in the drawings) delivers energy to the pistol 1 via a flexible hose arranged in the form of a coil 27 which surrounds the suspension cable 24 and is connected by means of a suitable union 28 to the yoke 2 which is accordingly of tubular construction. Compressed air supplied to the yoke 2 is admitted into the interior of the pistol body 5 through at least one of the two supporting pivots such as the pivot 6. To this end, an axial duct 31 of the pivot 6 is adapted to communicate with a radial duct 32 which opens into an annular groove 33 of the pivot at the level of a bore 34 formed in a sleeve 35 which terminates the corresponding arm 3 of the yoke 2 and is freely rotatable on said pivot. Two O-ring seals 36, 37 fitted respectively within two annular grooves formed in the cylindrical surface of the pivot ensure leak-tight articulation of the yoke on the handtool.

The pistol is actuated by means of a trigger 38 which is carried by the pistol-grip 39 and controls the admission of compressed air into the handtool jack from the space 41 of the pistol body to which compressed air is supplied continuously.

Thus the pistol is balanced since it is suspended from the yoke 2 on the horizontal geometrical axis 7 which passes through its center of gravity G. Furthermore, the pistol is carried by means constituting the equivalent of a knuckle bearing or universal joint. The pistol is in fact capable of pivotal displacement in space about three geometrical axes which are perpendicular to each other, namely as follows: the first horizontal axis 7 of pivotal displacement of the pistol in the yoke 2; the second horizontal axis which is perpendicular to the first and passes through the center of the bow and through the center of gravity G of the handtool, this movement being effected simply by displacement of the bow 11 in rolling motion on the roller 14; and finally the vertical axis which is materialized by the suspension cable 24. The pivotal movement of the pistol about the vertical axis takes place quite naturally under the action of a slight twist of the suspension cable or possibly of a chain instead of the cable. Simply by holding the pistol-grip, the user can perform all these movements instinctively and practically without effort since the handtool unit is continuously balanced.

The structure described in the foregoing permits amplitudes of angular movements which prove quite sufficient for the application which is contemplated. In one form of construction, an angular amplitude of 245° has been obtained in the case of pivotal displacement of the pistol in the yoke and an angular amplitude of 60° has been obtained in the case of displacement of the bow on the roller. It is readily apparent that twisting of the suspension cable also permits angular amplitudes of orientation which are wholly sufficient in practice.

What is claimed is:

1. A suspension device for a power-driven handtool and particularly of a slaughtering pistol or so-called humane killer, comprising a pistol-grip located in a vertical longitudinal mid-plane of said handtool, wherein said suspension device comprises a yoke whose two arms are capable of free pivotal motion with respect to the handtool body by means of two pivots on which the ends of said yoke arms are rotatably mounted on said body and the common horizontal geometrical axis of which passes substantially through the center of gravity of the handtool unit in a direction at right angles to the vertical longitudinal midplane aforesaid, the apex of said yoke being constituted by a bow having the shape of a circular arc whose center is located at the center of gravity of the handtool, said bow being supported by and capable of traveling on a roller which is freely rotatable on a spindle supported by the two ends of the arms of a shackle whose apex is adapted to be attached to a suspension member.

2. A device according to claim 1 equipped with a jack operated by fluid under pressure, wherein the yoke is tubular and provided with a union for connecting a pipe and supplying fluid under pressure to said jack by means of at least one of the two pivots aforesaid, said pivot or pivots being accordingly of hollow design and fitted with rotary seals.

* * * * *